Sept. 8, 1964 W. G. SCHARF 3,147,582
METHOD OF PRODUCING MULTI-COLORED FLAT YARNS
Filed Jan. 22, 1963
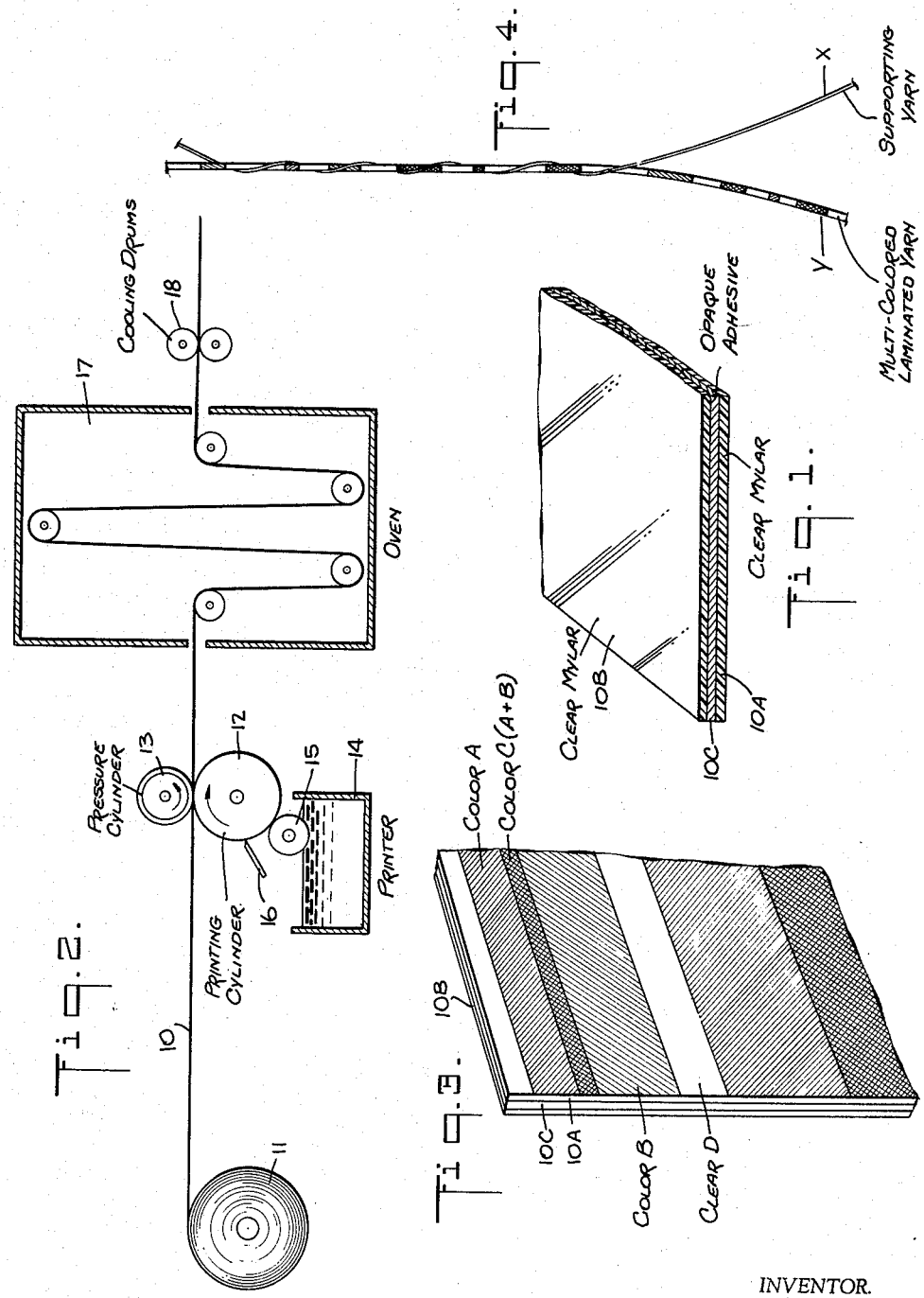
INVENTOR.
WALTER G. SCHARF
BY
ATTORNEY

United States Patent Office 3,147,582
Patented Sept. 8, 1964

3,147,582
METHOD OF PRODUCING MULTI-COLORED
FLAT YARNS
Walter G. Scharf, 243 Palmer Court, Ridgewood, N.J.
Filed Jan. 22, 1963, Ser. No. 253,155
3 Claims. (Cl. 57—165)

This invention relates generally to synthetic textile yarns, and more particularly to a method of manufacturing thin, multi-colored flat yarns of attractive appearance and of exceptionally high strength.

It is known to make flat yarns by slitting a broad web of synthetic material into narrow ribbons. When a yarn of exceptional thinness and high strength is desired, the preferred material for this purpose is usually formed of polymerized ethylene glycol terephthalate, the material being known commercially as Mylar.

Attempts have been made to apply color to the surfaces of a Mylar web before slitting, but to achieve acceptable results it has been found necessary to use extremely high concentrations of colorants. The reason for this is that biaxially oriented polymerized terephthalate is highly transparent and therefore gives rise to pale and washed-out color effects unless the color is laid down in high concentrations. Such concentrations entail a relatively low ratio of binder to colorant, and the resultant color layer on the web is not effectively bonded thereto and tends to flake off.

Accordingly, it is the main object of this invention to provide a multi-colored synthetic, flat yarn having a bright and attractive color coating which is well bonded to the yarn material.

More specifically, it is an object of the invention to impart translucency or opacity to a flat Mylar web, whereby colorant solutions may be applied thereto in reduced concentrations and yet produce acceptable results suitable for fabric styling.

Also an object of the invention is to provide a technique for printing a web of synthetic material having the desired degree of opacity with a variety of colors to produce a multi-colored yarn which when woven into fabric creates an impression comparable to that obtained in a fabric woven from several differently colored flat yarns.

Briefly stated, these objects are accomplished by combining two extremely thin webs of clear synthetic plastic material with a pigmented adhesive which imparts opacity or translucency to the laminated product, the laminated web then being multicolor-printed on both sides and thereafter slit to yarn size.

For a better understanding of the invention, as well as other objects and features thereof, reference is made to the following detailed description to be read in conjunction with the accompanying drawing, wherein:

FIG. 1 is a section taken through a laminated web in accordance with the invention;

FIG. 2 is a schematic diagram illustrating a printing process for applying color to said laminated web;

FIG. 3 is a perspective view of the multi-colored web produced by said process; and FIG. 4 shows a single supported thread of multi-color yarn in accordance with the invention.

Referring now to FIG. 1, the laminated web 10 in accordance with the invention is constituted by two plies of clear synthetic plastic material 10A and 10B bonded together by a layer of adhesive 10C. Plies 10A and 10B may be constituted by thin films of cellophane, acetate, tri-acetate, acetate butyrate, or other suitable transparent and flexible material. Preferably the ply material is constituted by a thin film of biaxially (longitudinally and transversely) oriented polyethylene terephthalate whose thickness is not in excess of ½ mil, and preferably is ¼ mil. Such material, despite its thinness, possesses high tensile strength. The invention is not limited to this range, and in practice thicker plies as high as 1 mil and above may be used.

The adhesive layer may be formed by commercially available rubber-base adhesives or plastic, synthetic or natural resins of the requisite degree of tackiness, or resins in conjunction with a plasticizer. To the resin and plasticizer may be added a cellulose derivative, such as nitrocellulose or cellulose ethers with other modifying ingredients. A quantity of an appropriate volatile solvent may be included to impart the desired viscosity to the adhesive.

The selected adhesive is applied to the opposed surfaces of the two Mylar plies to be united, the combination then being combined under heat and pressure. This can be carried out in a continuous manner by a pair of pressure rollers adapted to bring the broad webs into intimate contact.

In order to impart opacity or translucency to the laminated web there is mixed into the adhesive solution a pigment, such as a titanium oxide powder which produces an opaque adhesive of white color. Other opaque colors may be obtained by mixing into the adhesive suspension such pigments as chromic oxide to obtain a green ground, or ferric oxide if a red ground is preferred. Thus the laminated web will have a ground color and provide the necessary non-transparent foundation for effective multi-color printing.

In the printing process shown in FIG. 2, use is made of printing inks, preferably composed of a clear resin in solution, the resin chosen being compatible with the laminated web 10. Among the useable resins are polyester resins, acrylic and epoxy resins and nitrocellulose resins. Modified vinyl or modified nitrocellulose coatings may also be used. Polyester resins, for example, are soluble in organic solvents, such as ethylene dichloride or dioxane, and when cured provide a transparent film of good mechanical strength. Epoxy resins exhibit exceptionally good adhesion to a wide variety of materials, their physical characteristics being similar to polyesters.

Color is added to the resinous solution by means of pigments or dyes to form in effect a printing ink. When dried or cured, the ink forms a colored, transparent coating which adheres to the laminated web. Preferably dyestuff is used, such as Acetosol dyes manufactured by the Sandoz Company, Orasol made by Ciba, or Grasol made by Geigy.

In actual practice, I have prepared a coating solution for a Mylar base by dissolving a copolymer of polyethylene terephthalate and polyethylene isosthalate in dioxane (diethylene dioxide), available commercially as Dioxane 1,4 (Union Carbide). The ratio by weight of the powder to the solvent is usually between 7% and 15%. To this solution is added dye material, which in one example is Grasol Yellow 3G manufactured by Geigy. It is to be understood that the choice of dyes and the viscosities of the final coatings are quite flexible and are not limited to the above examples.

FIG. 2 shows a preferred process for multi-color printing the laminated opaque web 10, a rotogravure technique being used. The laminated web 10 drawn from a supply roll 11 passes through a rotogravure press including a printing cylinder 12 and a pressure cylinder 13, whereby the surface engaging the printing cylinder is printed with color bands or stripes to be later described.

Gravure printing is a process in which the image areas of the printing cylinder are recessed. The surface is first covered with ink and the excess wiped off, leaving ink only on the recessed image area, which color is transferred by pressure to the surface being printed.

The printing cylinder 12 is inked by means of a fountain 14 containing the ink solution described previously, the ink being applied to the cylinder 12 by means of an ink roll 15. The excess is removed by a doctor blade 16 and returned to the fountain. The pressure cylinder 13 is covered with a resilient rubber composition that presses the web surface in contact with the ink in the tiny cells of the printing surface. The drawing, for simplicity, shows only a single gravure unit for a single color. In multi-color printing, two or more units operate in tandem and each color must be dried before the next is printed. The web 10 therefore is passed while wet through oven 17 after each impression. The rotogravure process as it relates to the application of the resinous printing ink is conventional and standard equipment, and may be used for this purpose.

In order to generate random color effects rather than uniform patterns, the rotogravure cylinders are provided with uneven heads or stripes of printing surface, which are askew relative to the cylinder axis. The printing is carried out so that, as shown in FIG. 3, a first color band A is laid down, and a second color band B is laid down to overlap partially or fall over the first band to produce an intermediate band C composed of the A and B combination, and so on. There is, of course, no limit to the number of colors which may be laid down by this process.

The printing is not limited to bars or stripes, and other geometric forms may be used. The printing is carried out on both sides of the web, with the colors relative displaced to further vary the random coloration.

After each pass in the rotogravure press, the wet coating on the web is dried and cured by passing the web through the oven 17 which is properly heated and vented to drive off all solvents and at the same time to effect the drying or curing of the coating material. For heating purposes, any convection, conduction or radiant heat source may be employed, as determined by the coating characteristics. The temperature of the oven and the travel time therethrough are determined by the specific web and coating materials. The coating may be further cured by cooling drums 18 disposed at the exit end of the oven. Cooling may be accomplished by a circulating water system or a refrigerant.

Thereafter the coated laminated web may be slit or severed into flat threads by rotary knives in accordance with the usual practice in the art. Standard widths run in the order of 1/16 to 1/20 of an inch.

In practice the multi-colored yarn may be woven to form a fabric constituted by multi-colored warp threads and woof threads. The fabric then has the appearance of having been woven with many differently colored yarns rather than a common multi-colored yarn. Each thread, as shown in FIG. 4, may be formed by a supporting yarn X of conventional form in combination with the multi-colored yarn Y. This supported composite makes possible still other color effects, in that by providing a colored support filament, say in black or white, this basic color affords a background to set off the effect produced by the multi-colored yarn. Thus the color of the support filament may act to emphasize one of the yarn colors. It will be obvious that a great variety of decorative styling effects are possible.

In lieu of a laminated two-ply web having the desired opacity introduced by the pigmented adhesive therein, a single-ply, pigmented polyvinyl fluoride and oriented polyvinyl chloride may be used as the base material in a multi-colored yarn printed in the manner described above, or a single-ply Mylar base material may be used in which the ground color is introduced in the body of the Mylar.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. The method of manufacturing a multi-colored flat yarn, comprising the steps of laminating together two broad webs of transparent polymerized ethylene glycol terphthalate material with an opaque adhesive, printing different color areas on the surfaces of said laminated web by coating said web with thin solutions of dyed polymer material compatible with the web material which is thereafter cured to form a directly adherent multi-colored film thereon, slitting said printed laminated web into individual threads, and intertwisting said threads with a supporting yarn.

2. The method as set forth in claim 1, wherein said colors are applied by passing said laminated web through a rotogravure press.

3. The method of manufacturing a multi-colored flat yarn, comprising the steps of laminating together two webs of clear flexible synthetic plastic material of polymerized ethylene glycol terephthalate with an opaque adhesive layer to form a laminated web, applying different color areas to the surfaces of said laminated web by coating said web with thin solutions of dyed polymer material compatible with the web material which is thereafter cured to form a directly adherent multi-colored film thereon, and slitting the web to yarn size, said thin solutions being formed by dissolving a copolymer of polyethylene terephthalate and polyethylene iosothalate in a diethylene dioxide having a dye of the desired color added thereto.

References Cited in the file of this patent

UNITED STATES PATENTS

| | | |
|---|---|---|
| 2,129,504 | Prindle | Sept. 6, 1938 |
| 2,607,185 | Silverman | Aug. 19, 1952 |
| 2,714,569 | Prindle et al. | Aug. 2, 1955 |
| 2,772,994 | Lacy | Dec. 4, 1956 |
| 2,801,447 | Wolinski | Aug. 6, 1957 |
| 2,974,055 | Scharf | Mar. 7, 1961 |
| 3,012,303 | Whitaker et al. | Dec. 12, 1961 |
| 3,013,919 | Bialy | Dec. 19, 1961 |
| 3,069,746 | Scharf | Dec. 25, 1962 |